United States Patent
Albisu Iso et al.

(10) Patent No.: US 11,732,696 B2
(45) Date of Patent: Aug. 22, 2023

(54) LOAD SENSORS IN WIND TURBINES

(71) Applicant: General Electric Renovables Espana, S.L., Barcelona (ES)

(72) Inventors: Efren Albisu Iso, Barcelona (ES); Pedro Arroyo Beltri, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/539,432

(22) Filed: Dec. 1, 2021

(65) Prior Publication Data
US 2022/0178352 A1     Jun. 9, 2022

(30) Foreign Application Priority Data

Dec. 3, 2020 (EP) .................................. 20383053

(51) Int. Cl.
*F03D 17/00* (2016.01)

(52) U.S. Cl.
CPC .......... *F03D 17/00* (2016.05); *F05B 2260/80* (2013.01); *F05B 2260/83* (2013.01); *F05B 2270/331* (2013.01); *F05B 2270/808* (2013.01)

(58) Field of Classification Search
CPC .. F03D 17/00; F05B 2260/80; F05B 2260/83; F05B 2270/331; F05B 2270/808
See application file for complete search history.

(56) References Cited

U.S. PATENT DOCUMENTS

| | | | |
|---|---|---|---|
| 8,157,522 B2 | 4/2012 | Bolz | |
| 8,170,810 B2 * | 5/2012 | Volkmer | G01M 5/0033 702/41 |
| 8,265,885 B2 | 9/2012 | George | |
| 8,360,722 B2 | 1/2013 | Hoffmann et al. | |
| 8,463,085 B2 * | 6/2013 | Cribbs | F03D 1/0675 385/13 |

(Continued)

FOREIGN PATENT DOCUMENTS

| | | |
|---|---|---|
| CA | 2426711 C | 11/2009 |
| EP | 2615303 B1 | 12/2014 |

(Continued)

OTHER PUBLICATIONS

European Search Report Corresponding to EP20383053 dated May 21, 2021.

*Primary Examiner* — Pedro J Cuevas
(74) *Attorney, Agent, or Firm* — Dority & Manning, P.A.

(57) ABSTRACT

The present disclosure relates to a method for determining reliability of one or more load sensors in a wind turbine. The method comprises measuring loads with the load sensors during operation of the wind turbine; determining in-plane moments based on the measured loads; selecting the in-plane moments with 1 p frequency; and comparing the selected in-plane moments with theoretical in-plane moments due to a mass of the blade. The method then comprises determining that the load sensors have reduced reliability if the selected in-plane moments deviate from the theoretical in-plane moments by more than a first threshold value. The present disclosure also relates to wind turbine systems incorporating load sensors and methods for on-line determination of correct functioning of load sensors mounted on a wind turbine blade.

18 Claims, 8 Drawing Sheets

(56) References Cited

U.S. PATENT DOCUMENTS

| | | | |
|---|---|---|---|
| 8,511,177 B1 * | 8/2013 | Makaremi | G01M 5/0033 |
| | | | 73/847 |
| 8,757,003 B1 * | 6/2014 | Makaremi | G01M 5/0033 |
| | | | 73/847 |
| 10,612,524 B2 * | 4/2020 | Caponetti | G01L 5/12 |
| 10,677,765 B2 * | 6/2020 | Raso | G01N 29/043 |
| 11,168,668 B2 * | 11/2021 | Lowenhar | F03D 17/00 |
| 11,371,486 B2 * | 6/2022 | Schmid | F03D 17/00 |
| 11,448,195 B2 * | 9/2022 | Mai | F03D 80/40 |
| 2002/0000723 A1 | 1/2002 | Weitkamp | |
| 2009/0246019 A1 | 10/2009 | Volanthen et al. | |
| 2009/0263246 A1 | 10/2009 | Bolz | |
| 2010/0004878 A1 * | 1/2010 | Volanthen | F03D 17/00 |
| | | | 702/42 |
| 2011/0110778 A1 * | 5/2011 | Lim | F03D 7/0232 |
| | | | 416/61 |
| 2011/0158806 A1 * | 6/2011 | Arms | F03D 7/0224 |
| | | | 455/507 |
| 2011/0210551 A1 | 9/2011 | Scholte-Wassink | |
| 2013/0110414 A1 | 5/2013 | Caponetti et al. | |
| 2016/0186722 A1 * | 6/2016 | Olesen | F03D 7/048 |
| | | | 416/1 |
| 2018/0135601 A1 | 5/2018 | Caponetti et al. | |
| 2018/0156200 A1 * | 6/2018 | Caponetti | F03D 17/00 |
| 2018/0171983 A1 * | 6/2018 | Caponetti | G01K 13/08 |
| 2018/0180030 A1 * | 6/2018 | Thøgersen | G01L 5/12 |
| 2021/0199094 A1 * | 7/2021 | Mai | F03D 17/00 |

FOREIGN PATENT DOCUMENTS

| | | |
|---|---|---|
| WO | WO/0133075 A1 | 5/2001 |
| WO | WO2011092032 A1 | 8/2011 |
| WO | WO2017093512 A1 | 6/2017 |

\* cited by examiner

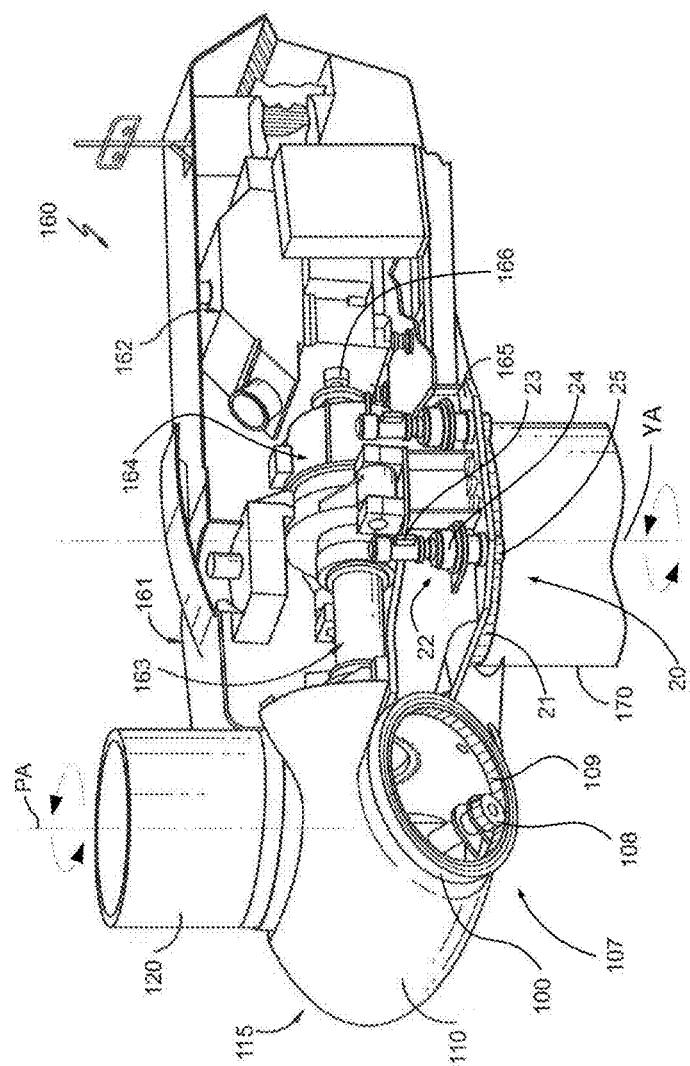

LOAD SENSORS IN WIND TURBINES

BACKGROUND

Modern wind turbines are used for supplying electricity to the grid. A wind turbine generally includes a tower with a nacelle supported on top of the tower. A wind turbine rotor comprising a hub and a plurality of wind turbine blades may be rotatably mounted to the nacelle.

The wind turbine blades may be set in motion by wind. The hub of the wind turbine may be operatively coupled with a rotor of a generator. As the hub and blades rotate, the kinetic energy of the wind is converted to kinetic mechanical energy of the wind turbine rotor and ultimately to electrical energy or power in the generator. The generator may typically be arranged inside the nacelle.

The wind turbine rotor may be coupled directly to the generator rotor in so-called direct drive wind turbines. Or the wind turbine rotor may include a main rotor shaft (a so-called "low speed shaft" which leads to a gearbox. A high-speed shaft of the gearbox may then drive the generator. Regardless of the topology of the wind turbine, the electrical power output of the generator may be fed to an electric grid. The connection of the generator to the grid may include e.g. a converter, transformer, medium voltage line and other.

A wind turbine controller may be configured to determine suitable actuator setpoints for the wind turbine based on the prevailing circumstances. The actuator setpoints for modern variable speed wind turbines include e.g. the generator torque and the pitch angle of the blades. Through control of the pitch angle(s) of the blade(s) and the generator torque, the speed of the rotor may be controlled, as well as the electrical power output, aerodynamic thrust and further mechanical loads. The purpose of the control system is generally to maximize electrical power output while at the same time keeping loads in the wind turbine at an acceptable level.

As mentioned before, the actuator setpoints of torque and pitch (but also other actuators such as yaw) may be changed in accordance with circumstances. Important input for the determination of the actuator setpoints include e.g. wind speed, and wind direction. The wind speed may be measured directly or indirectly e.g. through the use of a (generator) rotor speed sensor.

Wind turbines may also comprise load sensors on or in the blades for measuring loads on the blades caused by for example the wind and/or the weight of the blades. Too high loads on the blades can e.g. damage the blades and/or cause undesirable rotational speeds of the rotor which may damage other components of the wind turbine. The blade load sensors permit detecting high loads and make it possible to react, by e.g. acting on the pitch systems in such a way that loads on the blades may be reduced. These adjustments on the blades through the pitch systems may extend the life of the wind turbine and/or reduce the cost of producing power.

It is therefore important for the safe and efficient operation of a wind turbine that the load measurements as retrieved from load sensors are reliable, i.e. they correctly indicate the actual loads at any given time. Load sensors for measuring loads on wind turbines, and particularly wind turbine blades may include resistive strain gauges, fiber optic strain gauges or any other known strain sensing system. The performance of these kinds of sensors may degrade over time, under the influence of continuous loading, and under the influence of temperature changes, and from being exposed to different sorts of ambient conditions and environments.

Different blade loads may be defined for a wind turbine blade, namely edgewise loads, spanwise loads and flapwise loads. A spanwise direction refers to a direction along a longitudinal axis of the blade, extending from the blade root towards the blade tip. The edgewise direction refers to a direction along the chord of a section of the wind turbine blade, i.e. extending from leading edge to trailing edge. The flapwise direction is perpendicular to both the edgewise and the spanwise direction.

With respect to a wind turbine rotor, loads may be decomposed as in-plane loads (loads that are tangential to the rotor plane) and out-of-plane loads (loads that are perpendicular to the rotor plane). The rotor plane may herein be defined as a plane perpendicular to the rotor rotational axis and passing through a center of the blades at the blade root.

Blade load sensors can be calibrated in order to preserve their accuracy when taking measurements of the loads on the blades. Calibration normally comprises establishing correspondence between indications generated by the blade load sensors and values of reference according to calibration patterns (i.e. particular conditions for calibration). If the calibration process produces some inconsistency, suitable adjustments may be undertaken on the load sensors to improve their accuracy.

It is known that blade load sensors can be manually calibrated in a factory by e.g. statically pulling the blades to obtain particular conditions for calibration. This manual calibration is normally performed before mounting the blades on the wind turbine. However, over time, load sensors may need to be recalibrated.

EP 2 615 303 discloses a method of calibrating one or more load sensors of a blade of a wind turbine, wherein the wind turbine comprises: a main generator; a power electronic converter connected with the main generator; a rotor operationally connected with the main generator and carrying the blade. And the method being comprises: acting on the power electronic converter to operate the main generator as motor to set the blade in at least one predetermined condition; measuring loads in the predetermined condition using the load sensors of the blade; and calibrating the blade load sensors taking into account the measured loads.

Such a method can be carried out particularly after interruption of normal operation of a wind turbine.

It is also known that blade load sensors can be manually calibrated when the blades are mounted on the wind turbine by manually (i.e. mechanically) acting on the wind turbine to e.g. set the blade in a particular position (e.g. horizontal position) with a particular pitch angle. This manual calibration permits recalibrating the load sensors regularly. However, this type of calibration may take a long time and may be especially expensive for offshore wind turbines because operators need to go where the wind turbine is located.

It is also known to use automatic calibration of blade load sensors during operation of the wind turbine by recording several minutes of data (or indications or load measurements) from the blade load sensors. For example, data from the load sensors may be recorded e.g. when predetermined conditions for calibration are met during idle operation of the wind turbine at low winds. Some of said predetermined conditions may be obtained after several hours or days of idling operation of the wind turbine. Therefore, a drawback of this type of calibration may be that it can take a long time, depending on the wind conditions.

The present disclosure provides examples of methods and systems for determining reliability or correct functioning of load sensors that resolve at least some of the aforementioned disadvantages.

SUMMARY

In a first aspect, a method for determining reliability of one or more load sensors in a wind turbine is provided. The method comprises, measuring loads with the load sensors during operation of the wind turbine and determining in-plane moments with rotor rotational speed frequency of one or more blades based on the measured loads. The method then further comprises comparing the in-plane moments with rotor rotational speed frequency with theoretical in-plane moments due to a mass of the blades and determining that the load sensors have reduced reliability if the in-plane moments with rotor rotational speed frequency deviate from the theoretical in-plane moments by more than a first threshold value In accordance with this aspect, the reliability or correct functioning of load sensors can be determined during operation of the wind turbine, i.e. the operation of the wind turbine does not need to be interrupted or put in specific conditions in order to be able to determine whether the load sensors are correctly indicating the loads. The loads measured may be measured as in-plane moments or converted to in-plane moments. The in-plane moments at any given moment during operation will be a combination of aerodynamic loads and loads due to mass of the blades. The mass of the blades will however provide the same moment throughout every rotation of the blade. At a 12 o'clock position and at a 6 o'clock position, the mass of the blade will not contribute to a bending moment. But at a 3 o'clock position and a 9 o'clock position, the bending moment due to the mass of the blade will be at a maximum (in one direction, and in the opposite direction). The mass of the blade will have a well-defined contribution with 1 p frequency, i.e. the variation of the moment due to the mass will have the same frequency as the rotor rotational speed. The rotor in this respect refers to the wind turbine rotor, not to the generator rotor. The generator rotor may have the same rotational speed in the case of a direct drive wind turbine, but may have a very different speed in the case of a wind turbine with gearbox.

The terms "1 p frequency" and "rotor rotational speed frequency" may be used interchangeably throughout this disclosure.

By selecting the in-plane moments with the rotor rotational speed frequency and comparing the selected in-plane moments with theoretical in-plane moments due to a mass of the blade, a deviation between the two indicates a possible malfunctioning of the load sensors. Once such a possible malfunctioning is detected, different actions can be taken to reduce the risk of a malfunctioning load sensor.

BRIEF DESCRIPTION OF THE DRAWINGS

Non-limiting examples of the present disclosure will be described in the following, with reference to the appended drawings, in which:

FIG. 2 illustrates a detailed, internal view of a nacelle of a wind turbine according to one example;

DETAILED DESCRIPTION OF EXAMPLES

In these figures, the same reference signs have been used to designate matching elements.

Figure 1:
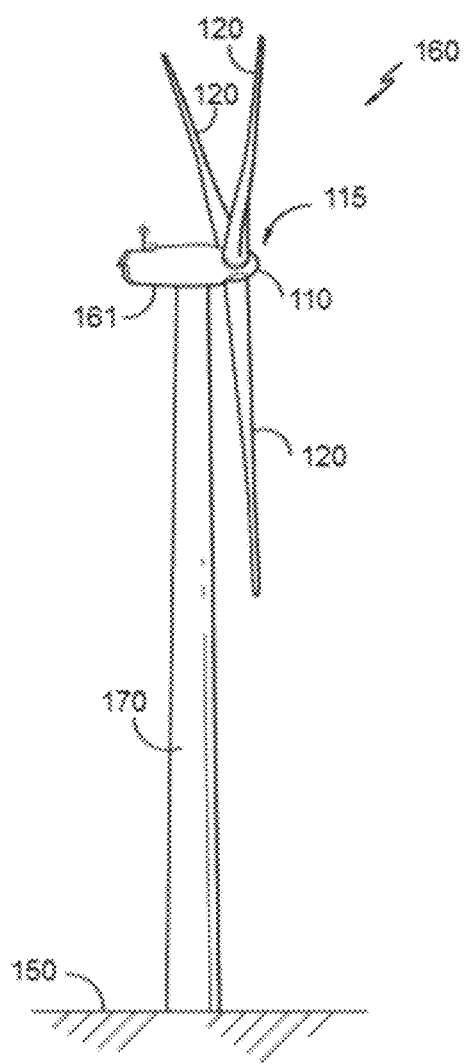
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

The energy produced by the generator may be delivered to a converter which adapts the output electrical power of the generator to the requirements of the power grid. The electrical machine may comprise electrical phases, e.g. three electrical phases. The converter may be arranged inside the nacelle or inside the tower or externally.

Figure 3A:
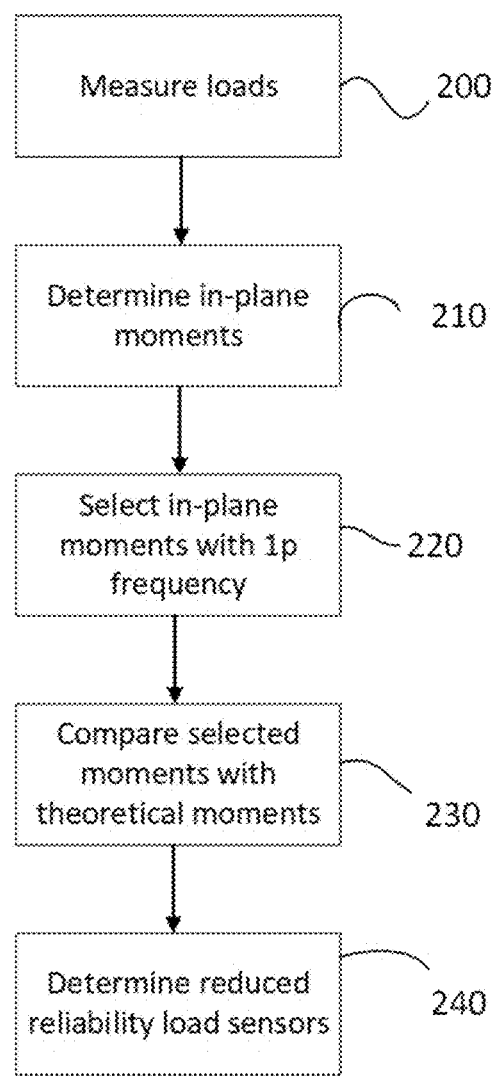
FIGS. 3A-3E schematically illustrates an example of a method for determining reliability of one or more load sensors in a wind turbine.

FIG. 3A schematically illustrates an example of a method for determining reliability of one or more load sensors in a wind turbine. The method comprises, at block 200, measuring loads with the load sensors during operation of the wind turbine. At block 210, in-plane moments based on the measured loads are determined. Then, at block 220, the in-plane moments with 1 p frequency are selected. At block 230, the selected in-plane moments with theoretical in-plane moments due to a mass of the blade are compared. Then, at block 240, the determination may be made that the load sensors have reduced reliability if the selected in-plane moments deviate from the theoretical in-plane moments by more than a first threshold value.

Various examples of the steps of the method, or blocks in FIG. 3A, will be explained with reference to FIGS. 3B-3E.

In some examples, the measuring loads at block 200 may comprise measuring flapwise and edgewise moments. Standard wind turbine blades may incorporate suitable load sensors. The load sensors may be strain gauges. Depending on where and how the load sensors are mounted, strains may be measured in different directions. Sensors arranged in the hub, or any other (indirect) blade support may be used to determine loads as well.

Figure 3B:
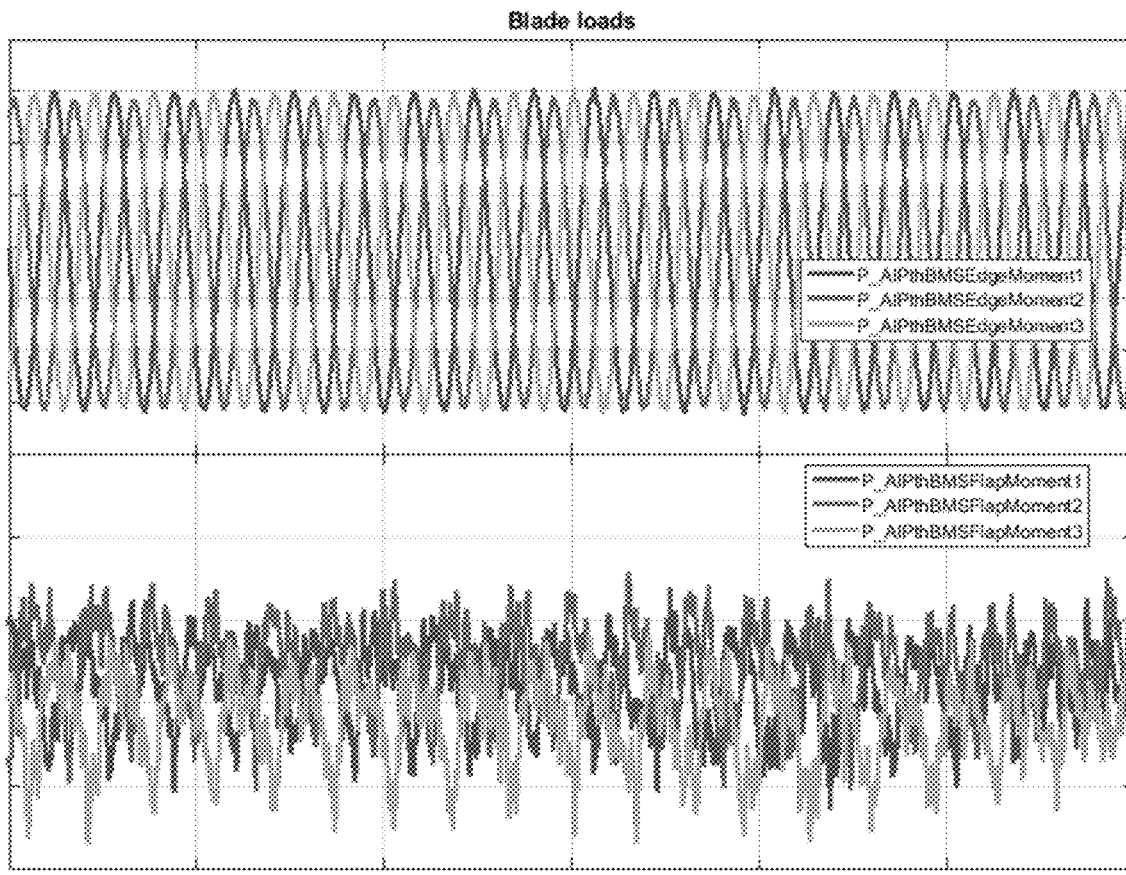
Figure 3C:
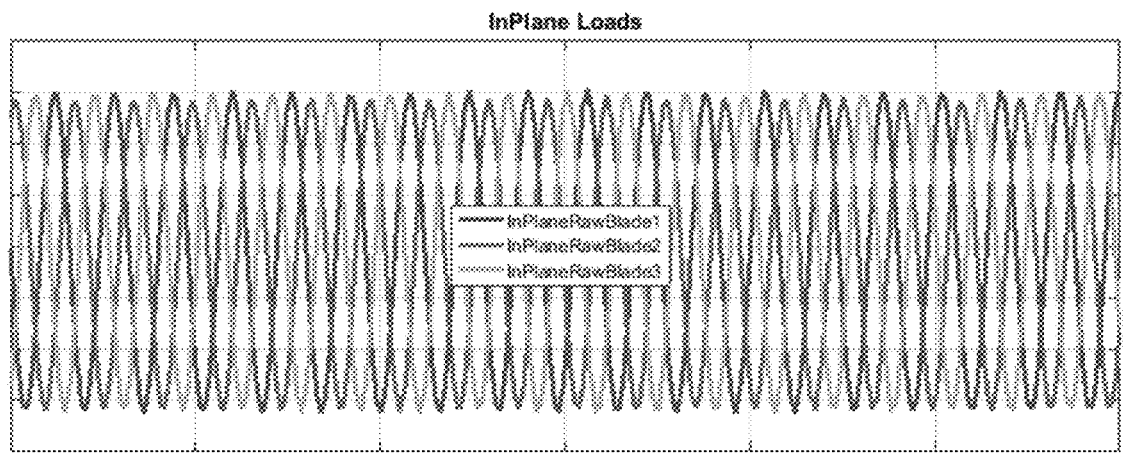

Edgewise and flapwise loads may be used in control of wind turbines. FIG. 3B illustrates measurement of flapwise and edgewise moments for three blades of a wind turbine throughout a number of full rotations.

The edgewise and flapwise moments may be converted to in-plane moments and out-of-plane moments based on a pitch angle of the blade at block 210. Only the in-plane moments need to be considered in the present method, since the loads of rotor wind turbine blades will be in-plane loads, not out-of-plane loads. The result for the three blades may be seen at FIG. 3C.

Figure 3D:
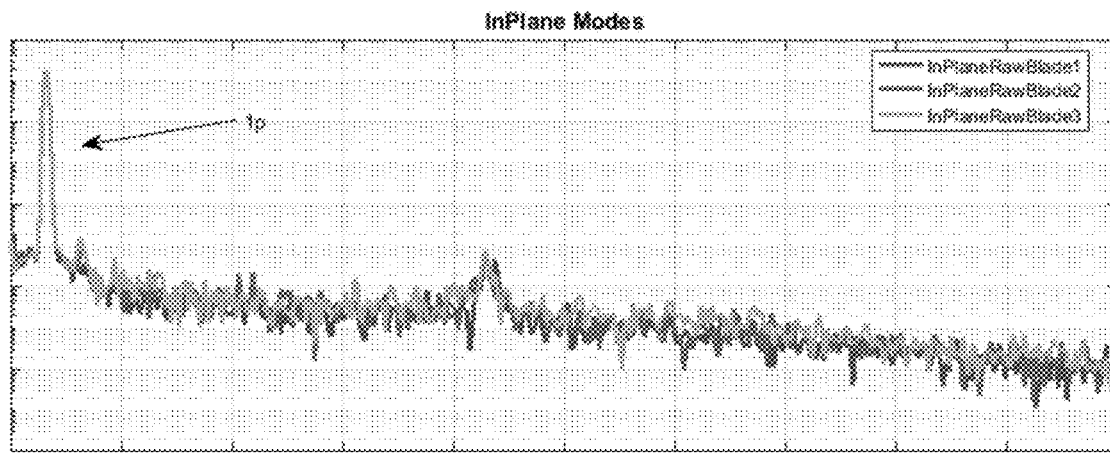
Figure 3E:
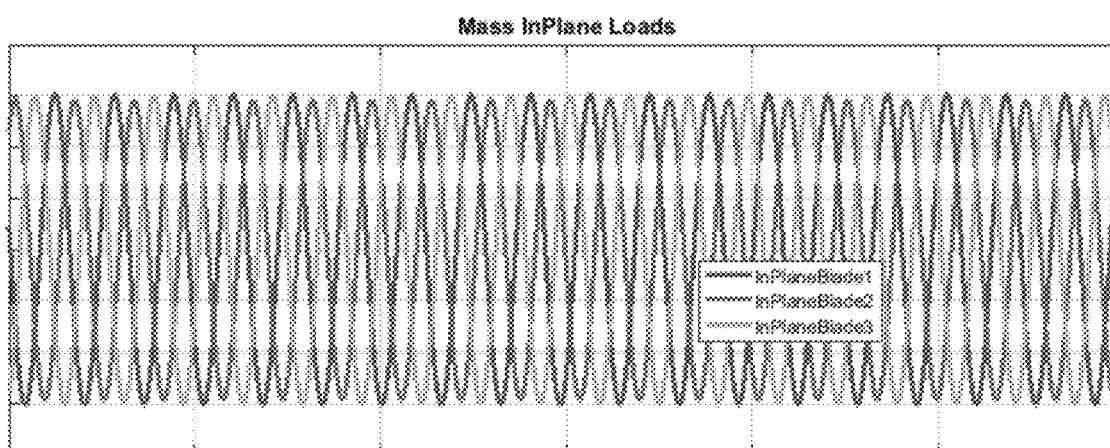

At block 220, the selecting the in-plane moments with rotor rotational speed frequency may comprise filtering the determined in-plane moments using a peak filter. A peak filter is a frequency filter that passes a narrow band of frequencies and is configured to stop all other frequencies. A peak filter in this respect is, in essence, a very narrow band pass filter. FIG. 3D schematically illustrates measured loads in the frequency domain and how a peak filter may select the in-plane moments of 1 p frequency. The result of the filter may be seen in FIG. 3E, in which for three blades of a wind turbine, in-plane modes with 1 p frequency are shown during a number of complete revolutions of the wind turbine rotor.

For the comparison between the theoretical in-plane moments due to the mass of the blade may be determined based on an azimuthal position of the rotor blade.

At block 240, the determination may be made that the load sensors have reduced reliability if the selected in-plane moments deviate from the theoretical in-plane moments by more than a first threshold value.

In some examples, the method may further comprise generating a first warning if the load sensors have reduced reliability. A first threshold may be defined which indicates a malfunctioning. If the threshold is passed, different actions may be taken. Maintenance may be planned to substitute or recalibrate load sensors. Or the operation of the wind turbine may be downrated, i.e. loads on the wind turbine may consciously be reduced at the expense of electrical power generation, because the measurements of the load sensors are not as reliable as they should be. In other examples, the wind turbine operation may be stopped if the load sensors are determined to be unreliable.

In some examples, the method may further comprise determining whether the selected in-plane moments deviate from the theoretical in-plane moments by more than a second threshold value, the second threshold value being higher than the first threshold value. In these examples, a first threshold may generate a warning signal (operators are made aware of a potential problem and operation may continue, as normal or with some changes), and the passing of a second threshold indicates a more serious warning (e.g. interruption of the operation).

In some examples, the threshold value may be a percentage of an absolute value of a theoretical in-plane moment. In some examples, the comparing the selected in-plane moments with theoretical in-plane moments due to a mass of the blade comprises determining a Root Mean Square value of the selected in-plane moments. These examples will be discussed with reference to FIGS. 4 and 5.

Figure 4A:
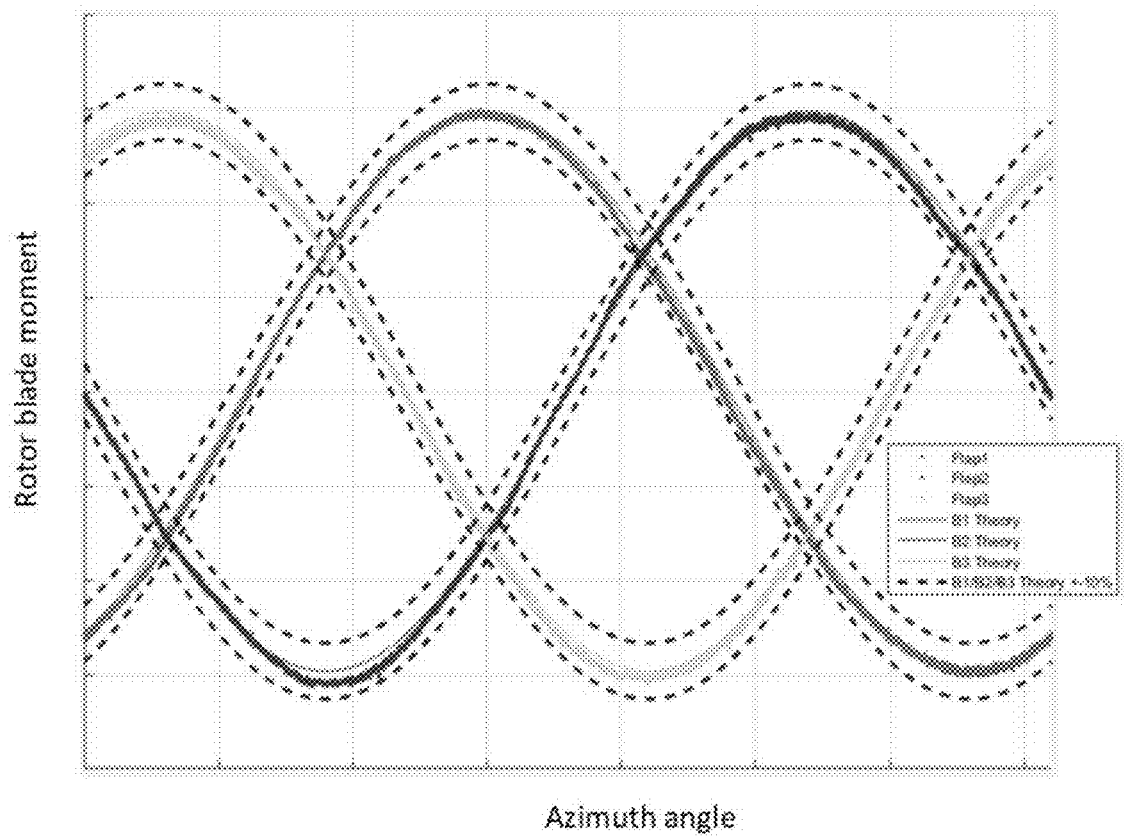
FIGS. 4A and 4B schematically illustrate an example of a comparison between theoretical in-plane moments due to the mass of rotor blades and measured in-plane moments with 1 p frequency.

FIG. 4A illustrates a comparison of in-plane moments due to mass of a wind turbine blade with in-plane moments of 1 p frequency. A bandwidth may be defined around the theoretical moment due to mass of a blade as indicated with dotted lines. The bandwidth may be defined as a percentage of the theoretical moment due to a mass of a blade. The bandwidth might also be of a given fixed value. As long as the moment of 1 p frequency derived from the actual measurements stays within the bandwidth (as in FIG. 4A), the load sensors may be regarded as functioning correctly. As mentioned before, more than one bandwidth might be defined in examples.

Figure 4B:
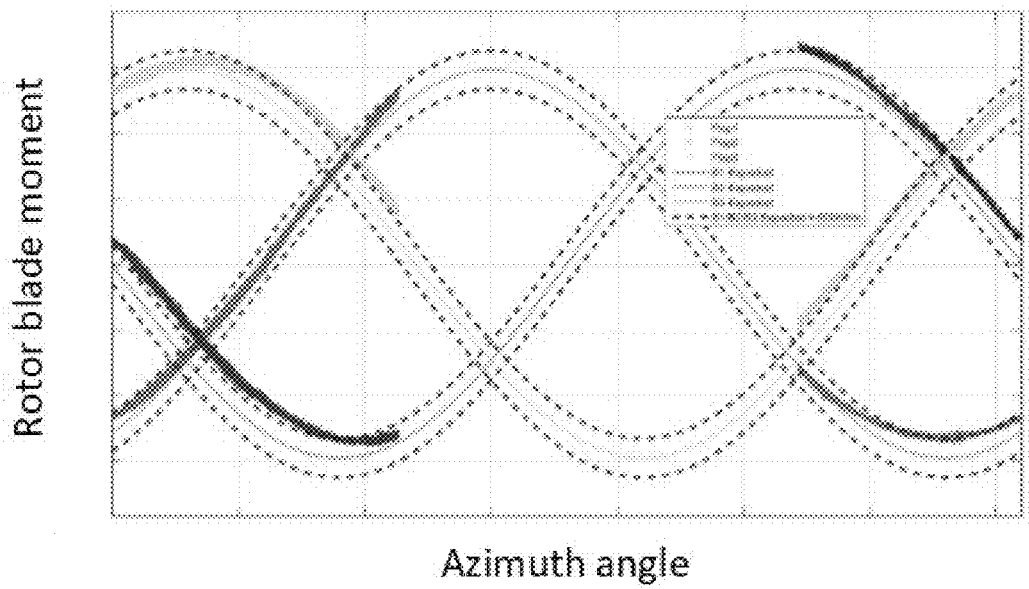

FIG. 4B illustrates an example in which the load sensors are determined less reliable or unreliable. It may be seen that in various occasions, the loads derived from the measurements go outside the defined bandwidth.

Figure 5A:
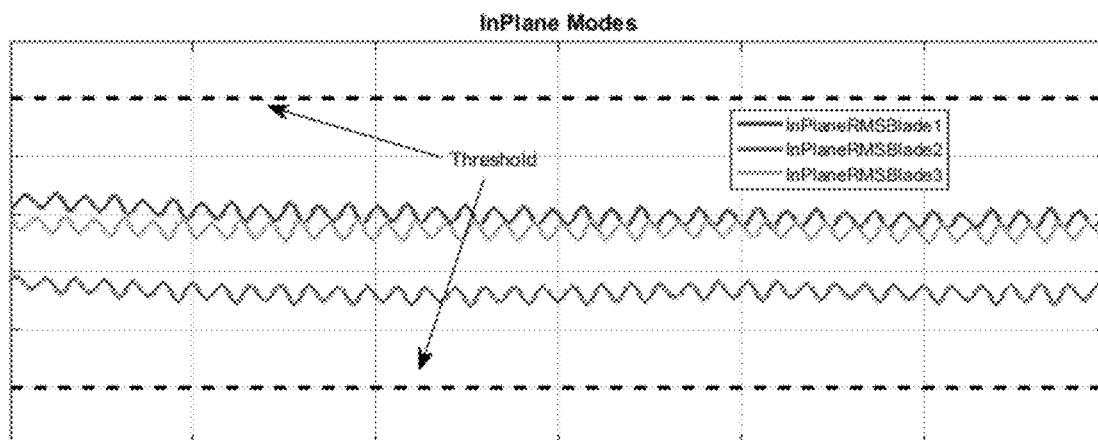
FIGS. 5A and 5B schematically illustrate another example of how a comparison between theoretical in-plane moments due to the mass of rotor blades and measured in-plane moments with 1 p frequency may be carried out.
Figure 5B:
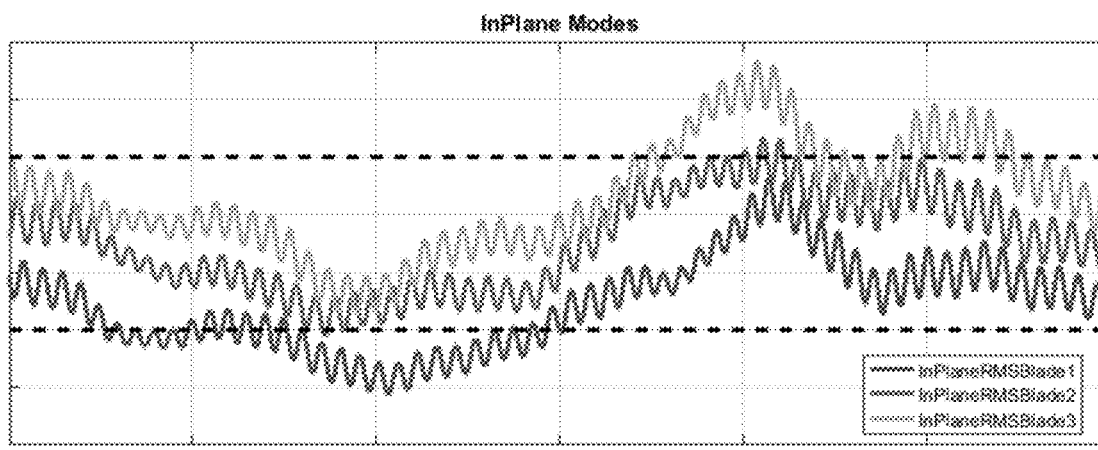

FIGS. 5A and 5B schematically illustrate an alternative example. In the example of FIG. 5, another comparison between the measured and theoretical moments is shown. For the 1 p in-plane moments, Root Mean Square (RMS) of deviations with respect to the theoretical moments, if indeed only mass of the blade is measured, should be roughly constant. Actual measurements will inevitably oscillate to some extent, because of e.g. inevitable vibrations of the blades. Root Mean Square (RSM) of differences between the theoretical and measured in-plane 1 p loads may be used for a comparison with a threshold. In the example of FIG. 5A, the RMS values stay well within a defined bandwidth, i.e. deviation is below a given threshold. In FIG. 5B on the other hand, it may be seen that for all three blades, RMS exceeds a given threshold. A malfunctioning of different load sensors for the different blades may be concluded.

Also when comparing RMS to determine a deviation from a theoretical curve or theoretical loads, more than one threshold, or more than one bandwidth may be defined.

During operation of the wind turbine, both the examples of FIGS. 4 and 5 may be used at the same time, or one of the examples may be selected. In some examples, the comparison according to FIG. 4 may be used particularly for slow rotations of the wind turbine, or measurements after an interruption of operation and the comparison according to FIG. 5 may be used for steady state operation above a minimum rotor speed.

In a further aspect, of the present disclosure a wind turbine system is provided. The system comprises a wind turbine 160 including a wind turbine rotor 115 with a plurality of blades 120. The system includes a plurality of load sensors for measuring loads on the blades, and a control system. The control system may be configured to receive signals from the load sensors during operation, determine in-plane moments on one or more of the blades, select the in-plane moments with 1 p frequency for the one or more blades and compare the selected in-plane moments with theoretical in-plane moments due to a mass of the one or more blades.

The control system may further be configured to generate a warning signal if the selected in-plane moments deviate from the theoretical in-plane moments by more than a predefined threshold.

In some examples, each of the blades may comprise strain gauges. Suitable strain gauges may include resistive foil strain gauges. The resistive strain gauges may be attached to the blade with a suitable glue, e.g. epoxy based glue. Other types of strain gauges and sensors may also be used such as e.g. piezoresistors, capacitive strain gauges, or fiber optics to measure strain along an optical fiber.

In some examples, the strain gauges may be mounted such as to measure edgewise and flapwise loads.

In some examples, the load sensors may be mounted in or near a root portion of the blades. In examples, measurements from load sensors on the blades that are not at the root of the blade may be extrapolated to indicate moments at the root of a blade. In examples, the sensors may be mounted at a suitable location on the hub, instead of the blade.

In some examples, the control system may be at a remote location from the wind turbine. The control system may be part of a SCADA system of a wind farm, or may be at a remote operating centre. In some examples, the wind turbine controller itself may incorporate the functions for determining a potential malfunction or loss of reliability of the load sensor.

Figure 6:
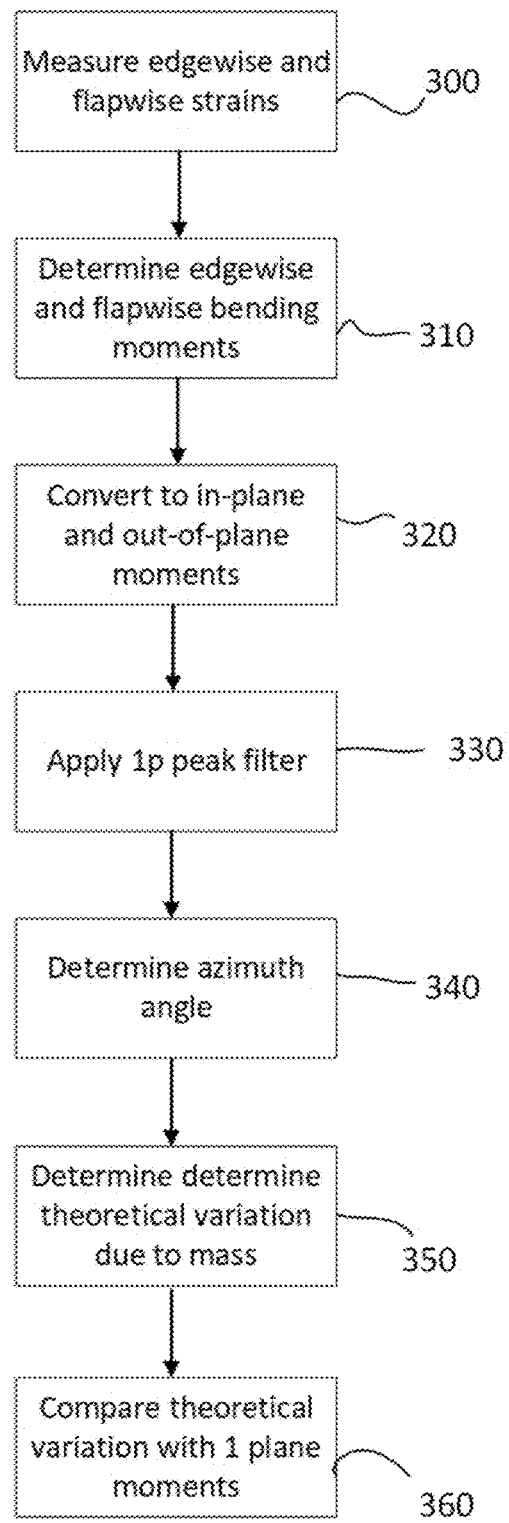
FIG. 6 schematically illustrates a method for on-line determination of correct functioning of load sensors mounted on a wind turbine blade.

In a further aspect, with reference to FIG. 6, a method for on-line determination of correct functioning of load sensors mounted on a wind turbine blade is provided. On-line, as used herein shall mean that the method can be carried out during standard operation of the wind turbine, i.e. without the need of interrupting the operation of the wind turbine and without the need to recreate a specific load or rotational speed scenario.

The method may comprise, at block 300, measuring edgewise and flapwise strains in the wind turbine blade. At block 310, edgewise and flapwise bending moments in the wind turbine blade based on the measured strains can be determined. At block 320, the edgewise and flapwise bending moments may be converted to measured in-plane moments and measured out-of-plane moments on the wind turbine blade. A peak filter may be applied, at block 330, to determine the measured in-plane moments with 1p frequency. At block 340, an azimuth angle of the rotor blade is determined, and at block 350, based on the azimuth angle, a theoretical variation of a moment due to the mass of the rotor blade can be determined. At block 360, the theoretical variation of the moment due to the mass of the rotor blade may be compared with the in-plane moment with 1 p frequency.

In some examples, the load sensors may be determined to function correctly, if the measured in-plane moments with 1 p frequency substantially corresponds to the theoretical variation of the moment due to the mass of the rotor blade. Whether or not the measured in-plane moments correspond substantially to the theoretical variation along a rotor rotation may be determined in a variety of manners. One or more thresholds may be used. And the thresholds may be defined in different manners.

In some examples, the method may comprise generating a warning if the measured in-plane moments with 1 p frequency deviate from the theoretical variation of the moment due to the mass of the rotor blade by more than a first threshold. Such a warning signal may be sent to an operator at a remote operating center, and/or may be sent to a wind turbine controller or SCADA system to implement a predefined action for such a warning signal.

In some examples, the method may further comprise downrating the wind turbine if the warning is generated.

In some examples, the edgewise and the flapwise bending moments in the wind turbine blade may be determined at a sensor location in the blade, and these may be converted to edgewise and flapwise bending moments at a root of the blade.

The order shown of method steps in FIGS. 3A and 6 are not to be regarded as necessarily sequential. In particular, the determination of azimuth angles does not need to occur at any specific moment of time in comparison to the measurement of the loads. The measured loads and azimuth angle only need to be correlated in time to make a meaningful comparison. Also, the methods may be continuously carried out during operation of the wind turbine. Steps may be carried out at a frequency of more than 1 HZ, specifically at a frequency of higher than 10 Hz.

Examples of the methods disclosed herein may be implemented with hardware, software, firmware and combinations thereof.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the disclosure herein may be implemented or performed with one or more general-purpose processors, a digital signal processor (DSP), cloud computing architecture, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also related to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for determining reliability of one or more load sensors in a wind turbine, comprising:
    measuring loads on one or more blades on a rotor of the wind turbine with the load sensors during operation of the wind turbine with the rotor operating at a rotor rotational speed frequency;
    from the measured loads, determining in-plane moments acting on the blades at the rotor rotational speed frequency;
    at the rotor rotational speed frequency of the rotor, determining azimuthal positions of the blades and, with the azimuthal positions, generating theoretical in-plane moments on the one or more blades at the rotor rotational speed frequency due only to a mass of the blades;
    comparing the in-plane moments at the rotor rotational speed frequency with the theoretical in-plane moments due to mass of the blades; and
    determining that, the load sensors have reduced reliability if the in-plane moments at the rotor rotational speed frequency deviate from the theoretical in-plane moments at the rotor rotational speed frequency by more than a first threshold value.

2. The method according to claim 1, wherein the step of measuring loads comprises measuring flap-wise and edge-wise moments.

3. The method according to claim 2, comprising using a pitch angle of the blades to convert the flap-wise and edge-wise moments to in-plane moments and out-of-plane moments.

4. The method according to claim 1, wherein the measured loads are converted to bending moments and the step of determining the in-plane moments at the rotor rotational speed frequency comprises filtering the bending moments using a peak filter.

5. The method according to claim 1, wherein the threshold value is a percentage of an absolute value of the theoretical in-plane moments.

6. The method according to claim 1, wherein the step of comparing the determined in-plane moments with the theoretical in-plane moments due to a mass of the blades comprises determining a Root Mean Square value of the determined in-plane moments.

7. The method according to claim 1, further comprising generating a first warning signal when the load sensors have reduced reliability.

8. The method according to claim 7, further comprising determining whether the determined in-plane moments of the blades deviate from the theoretical in-plane moments of the blades by more than a second threshold value, the second threshold value being higher than the first threshold value.

9. The method according to claim 8, further comprising interrupting the operation of the wind turbine when the determined in-plane moments of the blades deviate from the theoretical in-plane moments of the blades by more than the second threshold value.

10. A wind turbine system comprising:
    a wind turbine including a wind turbine rotor with a plurality of blades,
    a plurality of load sensors for measuring loads on the blades, and a control system configured to determine reliability of the load sensors in accordance with the method of claim 1.

11. The system of claim 10, wherein the load sensors comprise strain gauges.

12. The system of claim 11, wherein the strain gauges are mounted so as to measure edge-wise and flap-wise loads on the blades.

13. The system of claim 10, wherein the sensors are mounted in or near a root portion of the blades.

14. A method for on-line determination of correct functioning of load sensors mounted on a wind turbine blade, wherein the wind turbine blade is on a rotor rotating at a rotor rotational speed frequency, comprising:
- measuring edge-wise and flap-wise strains in the wind turbine blade;
- from the edge-wise and flap-wise strains, determining edge-wise and flap-wise bending moments in the wind turbine blade;
- converting the edge-wise and flap-wise bending moments to in-plane moments and out-of-plane moments on the wind turbine blade;
- applying a peak filter to determine the in-plane moments at the rotor rotational speed frequency;
- determining an azimuth angle of the wind turbine blade;
- from the azimuth angle, determining a theoretical moment on the wind turbine blade due to mass of the wind turbine blade; and
- comparing the theoretical moment due to the mass of the wind turbine blade with the in-plane moment at the rotor rotational speed frequency.

15. The method of claim 14, wherein the load sensors are determined to function correctly when the measured in-plane moments at the rotor rotational speed frequency substantially corresponds to the theoretical moment due to the mass of the wind turbine blade.

16. The method of claim 15, further comprising generating a warning when the measured in-plane moments at the rotor rotational speed frequency deviate from the theoretical moment due to the mass of the wind turbine blade by more than a first threshold.

17. The method of claim 16, further comprising down-rating the wind turbine when the warning is generated.

18. The method of claim 14, wherein the step of determining the edge-wise and the flap-wise bending moments in the wind turbine blade comprises determining edge-wise and flap-wise bending moments at a sensor location in the wind turbine blade, and converting the edge-wise and flap-wise bending moments at the sensor location to flap-wise and edge-wise bending moments at a root of the wind turbine blade.

* * * * *